(12) United States Patent  
Fox

(10) Patent No.: US 7,926,448 B2  
(45) Date of Patent: Apr. 19, 2011

(54) PET CARRIER GARMENT

(76) Inventor: Donna Fox, Washington, NJ (US)

( * ) Notice: Subject to any disclaimer, the term of this patent is extended or adjusted under 35 U.S.C. 154(b) by 396 days.

(21) Appl. No.: 12/068,680

(22) Filed: Feb. 11, 2008

(65) Prior Publication Data

US 2009/0199781 A1   Aug. 13, 2009

(51) Int. Cl.  
*A01K 1/00* (2006.01)
(52) U.S. Cl. ....................................................... 119/497
(58) Field of Classification Search .................. 119/497, 119/857, 71; 2/69, 85, 93, 94, 247  
See application file for complete search history.

(56) References Cited

U.S. PATENT DOCUMENTS

| | | | |
|---|---|---|---|
| 3,026,527 A * | 3/1962 | Polk ..................................... | 2/94 |
| 4,079,467 A | 3/1978 | Baldwin | |
| D266,800 S | 11/1982 | Kula et al. | |
| 4,475,251 A * | 10/1984 | Hopkins .............................. | 2/94 |
| 4,476,587 A * | 10/1984 | Itoi ..................................... | 2/94 |
| 4,606,078 A | 8/1986 | Tkacsik | |
| 4,882,786 A * | 11/1989 | Gross .................................. | 2/94 |
| 5,176,102 A | 1/1993 | Tracy | |
| 5,309,572 A * | 5/1994 | Seamans ........................... | 2/112 |
| 5,946,725 A * | 9/1999 | Shatzkin et al. ................... | 2/106 |
| 6,343,727 B1 | 2/2002 | Leach | |
| 6,986,164 B1 * | 1/2006 | Morales ............................. | 2/94 |
| 7,152,247 B2 * | 12/2006 | Parsons ............................. | 2/94 |
| 7,296,303 B1 | 11/2007 | Samet | |
| 7,631,368 B1 * | 12/2009 | Samson ........................... | 2/247 |
| 2004/0250331 A1* | 12/2004 | Bayer ................................. | 2/69 |
| 2006/0005294 A1 | 1/2006 | Fugazzi | |
| 2006/0162041 A1* | 7/2006 | Tengbom et al. .................. | 2/85 |

* cited by examiner

*Primary Examiner* — Rob Swiatek  
*Assistant Examiner* — Valentina Xavier  
(74) *Attorney, Agent, or Firm* — Thomas J. Germinario

(57) ABSTRACT

A pet carrier garment has a full frontal liner that creates a enclosure within which a small pet can be carried close to the owner's body, thereby providing security, warmth and comfort for the pet, as well as affording ample room for the pet to move about while still keeping the pet securely confined.

10 Claims, 4 Drawing Sheets

PET CARRIER GARMENT

BACKGROUND OF THE INVENTION

The present invention relates to a garment to be worn on a person's upper torso, such as a coat, jacket, sweater, shirt, blouse, sweatshirt, or vest, and more particularly to such a garment that has an inner liner in which a small pet can be carried.

While larger dogs typically accompany their owners on a leash, small pets, such as miniature dog breeds, cats, and ferrets, are often carried by their owners. But carrying a small pet in one's arms presents several disadvantages. One or both hands may be occupied in holding and controlling the pet, making it awkward to write, open doors, pick up objects, etc. If this mode of carrying a small pet is uncomfortable for the owner, it is even more uncomfortable and distressing for the pet. A small pet is vulnerable and lacks security when carried exposed in the arms of its owner. Passing strangers, other animals, sudden sounds and lights are apt to upset the pet or even induce panic.

The problems of carrying a small pet are similar in many ways to the problems of carrying an infant or small child. A variety of harnesses, slings and papoose-type carriers have been used for hands-free transport of infants, but these carriers are typically designed to accommodate a seated human torso, with openings to accommodate the legs. Such harness-type carriers use a pouch secured to the parent's torso by multiple straps that extend over the shoulders and around the back and waist. An example of such a harness-type baby carrier is disclosed in Kula et al., Des. 266,800.

Attempts have been made to adapt the harness-type carrier for transport of a pet. One such pet carrier is taught by Tracy, U.S. Pat. No. 5,176,102. In Tracy, the leg openings at the bottom of the baby pouch are replaced by a rigid platform on which the pet can sit. A zipper down the front of the pouch allows access to insert and remove the pet from the pouch enclosure. A drawstring or elastic gather at the top of the pouch is used to confine the pet in the enclosure.

The application of harness-type carriers to pet transport is, however, problematic in several respects. The pouch enclosure separates a small pet from the security of physical contact with it owner and leaves the pet exposed to threatening exterior interactions. In order to be effective in confining the pet, the pouch must severely restrict the pet's mobility. Drawstrings or elastic used to constrict the top of the pouch will cause discomfort to the pet and may even cause choking if the pet is struggling to escape from the enclosure. As for the owner, the harness is awkward to put on and take off, and the weight-bearing straps exert pressure and create fatigue in the shoulders and back. Furthermore, the appearance of the harness-type carrier is quite unattractive, and not much can be done to dress it up.

The foregoing drawbacks can be overcome by abandoning the harness-type carrier in favor of a pet carrier that is an integral part of a garment worn by the owner on his or her upper torso. Again, the analogous field of baby carriers provides us with some teachings of carriers that are integrated with a garment. Examples are Baldwin, U.S. Pat. No. 4,079, 467, Tkacsik, U.S. Pat. No. 4,606,078, Shatzkin et al., U.S. Pat. No. 5,946,725, and Leach, U.S. Pat. No. 6,343,727.

In Baldwin's invention, the baby is carried inside the parent's coat. The infant's lower torso is supported in a seated position in an expandable inner pocket of the coat by a carrying sling which goes over the shoulder of the wearer. The carrying sling is needed because the bottom of the coat is open and the child would otherwise be liable to fall out. Therefore, the Baldwin design still retains some of the disadvantages of the harness-type carriers, insofar as the sling restricts the infant's mobility and involves the pressure of a weight-bearing strap on the parent's shoulder. The Baldwin carrier does, however, represent a step in the right direction, insofar as it allows close physical contact of the baby with the parent, which is an important aspect of the child's security, warmth and comfort.

The Tkacsik patent teaches a large maternity coat within which an infant is supported by a separate shoulder-harnessed baby carrier. As in the Baldwin patent, the carrier is not fully integrated with the garment, but still requires the use of a harness-type apparatus to support the weight of the child. Therefore, lack of mobility for the infant and discomfort for the parent continue as drawbacks of this design. But, as with Baldwin, the creation of an infant enclosure within the parent's garment provides the security and warmth of physical contact between parent and child.

The Shatzkin patent represents a further step toward integration of the infant enclosure with the parent's garment. Here, the infant is supported in a seated posture by a pouch attached to the inside of the garment. The bottom of the pouch has an inverted trapezoidal configuration, wherein the baby's legs are inserted through the oblique sides of the trapezoid. Hence, while the lower torso of the infant is secured by the pouch, the child's upper torso retains some freedom of movement. While this design provides a measure of mobility for the child as well as maintaining physical contact between parent and child, its pouch configuration is specific to human anatomy and is not readily adaptable to a pet carrier. In order to confine a pet, such a pouch would have to enclose the pet's entire body below the neck, thereby again engendering the problem of unduly restricted mobility for the pet.

In the Leach baby carrier, the reclining infant is supported from below by a draw-string closure at the bottom of the garment. The infant enclosure is more capacious than that of Shatzkin and could accommodate an animal as well as a human. But the carrier garment is a specialized vest rather than an integral part of a general-purpose garment, and it is designed to be worn on the outside of the parent's regular garments, thus diminishing the level of physical contact between parent and child and exposing the child to the elements of the outside environment.

Following the lead of the infant-carrying garments, the prior art contains two teachings of pet-carrying garments: Fugazzi, Pub. No. US2006/0005294, and Samet, U.S. Pat. No. 7,296,303.

Fugazzi teaches a pet-carrying sweatshirt, in which a pouch is formed on the outside front of a sweatshirt by sewing on a cloth panel. Since the pet is not securely confined in this pouch, however, supplemental strap restraints must be used, thereby limiting the pet's mobility. Also, because the pouch is on the outside of the garment, this design does not afford the pet with the warmth, comfort and security of an interior enclosure in close proximity to the owner's body.

Samet teaches a pet-carrying pouch attached to the outside of a garment with a confining drawstring at the top of the pouch. This design has the disadvantages of overly restricting the pet's movement, as well as potentially choking the pet with the drawstring around its neck. Also, as with Fugazzi, the pouch separates and isolates the pet from the security and comfort of physical contact with the owner.

Therefore, the prior art offers no teachings—either in the field of pet carriers or in the field of baby carriers adaptable to pet use—that meet all of the optimal criteria of a pet-carrying garment, those being:

A design in which the carrier is an integral part of a general-purpose garment;

A roomy pet enclosure which allows freedom of movement for the pet;

A configuration that affords close physical contact between the pet and its owner; and A strapless design in which the pet's weight is not supported by the owner's shoulders.

All of these criteria are fulfilled by the pet carrier garment of the present invention. It features within the front of the garment a full frontal liner which is open at the neck and extends vertically from the shoulders to the waist of the garment and laterally from the left-side seam to the right-side seam of the garment. This design creates a roomy pet enclosure between the front interior of the garment and the full frontal liner. At the waist of the garment is a draw-string that can be tightened to secure the bottom of the pet enclosure. The full frontal liner is made of a thin fabric or a mesh that permits body heat to pass between pet and owners and provides the pet with the security of intimate contact with the owner. A zipper or series of fasteners in the front of the garment can be used to open or close the front of the garment to varying degrees, thereby adjusting the level of exposure and interaction between the pet and the outside surroundings.

SUMMARY OF THE INVENTION

An object of the present invention is to provide a hands-free means of carrying a small pet which can be worn as a general-purpose garment, such as a coat, jacket, sweater, shirt, blouse, sweatshirt, or vest.

Another object of the present invention is to provide a general-purpose garment having a pet-carrying component that is fully integrated with the structure of the garment and requires no supplemental means, such as pouches or straps, to support the weight of the pet or confine its movements.

A further object of the present invention is to provide a pet carrier garment which has a spacious pet enclosure within which the pet is free to move while still being securely confined. Such a pet enclosure is created by the space between the interior side of the front of the garment and a full frontal liner attached thereto at the sides and bottom.

Yet another object of the present invention is to provide a pet carrier garment in which the bottom of the pet enclosure is secured by a draw string, thereby supporting the weight of the pet without unduly restricting its movement.

Yet a further object of the present invention is to provide a pet carrier garment in which the pet enclosure allows close physical contact between the pet and the owner, including tactile contact and transfer of body heat, such that the pet enjoys the comfort and security of closeness to the owner's body.

Still another object of the present invention is to provide a pet carrier garment in which the front of the garment can be opened to varying degrees by a zipper or a series of fasteners, thereby opening the pet enclosure to varying degrees to permit greater or lesser exposure and interaction of the pet with the outside environment.

Still a further object of the present invention is to provide a pet carrier garment that is structurally simple, attractive in appearance, easy to put on and remove, and inexpensive to fabricate.

All of these and other beneficial objectives are realized by the present invention. The present invention comprises a garment designed to cover the human torso from the hips or waist upward to the neck. The garment can be sleeved, half-sleeved, short-sleeved, or sleeveless. It can be collarless, or it can have a collar that can be adjusted to cover all or portions of the neck. It can be hoodless, or it can have a hood that can be lowered to expose the head or raised to cover the head.

The garment comprises two sheets, a front sheet and a back sheet, both consisting of roughly rectangular pieces of cloth having dimensions corresponding to those of an upper human torso. The front sheet and the back sheet can be single-layered or multi-layered, lined or unlined, and they can be composites of multiple pieces of interconnected cloth. The front sheet and the back sheet each have an interior surface and an exterior surface. The garment further comprises a neck opening, two arm openings (a right arm opening and a left arm opening), and a waist opening. The front sheet and the back sheet each have four borders: a top border, two side borders (a right-side border and a left-side border), and a bottom border. The top border of the front sheet is attached to the top border of the back sheet at two shoulder seams (a right shoulder seam and a left shoulder seam), which extend from the tops of the arm openings to either side of the neck opening. The two side borders of the front sheet are attached to the two side borders of the back sheet at two side seams (a right side seam and a left side seam). The right-side border of the front sheet is attached to the left-side border of the back sheet at the right side seam, which extends from the bottom of the right arm opening to the place where the bottom borders of the two sheets meet. The left-side border of the front sheet is attached to the right-side border of the back sheet at the left side seam, which extends from the bottom of the left arm opening to the place where the bottom borders of the two sheets meet.

The space between the unattached sections of the bottom borders of the front and back sheets, or the space between sections of the front and back sheets above the bottom border, can be expanded to make an opening approximately 25 to 45 inches in circumference, which constitutes the waist opening. The area between the unattached sections of the top borders of the front and back sheets can be expanded to make an opening approximately 12 to 18 inches in circumference, which constitutes the neck opening. The two areas between the unattached sections of the side borders of the front and back sheets can be expanded to make openings, each approximately 12 to 18 inches in circumference, which constitute the arm openings.

Optionally, a short, half, or full sleeve can extend from each of the arm openings. Optionally, a collar or hood can extend from around the neck opening.

For a waist-length garment, the bottom borders of the front and back sheets are doubled over to create a hem around the waist opening. Alternately, for a garment that extends below the wearer's waist, sections of the front and back sheets above the bottom borders are doubled over to create a hem around the waist opening. The hem can also be formed as a narrow channel within two cooperating multi-layered segments of the front and back sheets. Within the hem is inserted a cord of length about 3 to 6 inches greater than the circumference of the waist opening. The opposite ends of the cord are juxtaposed to form a drawstring, whereby the length of the portion of the cord within the hem can be expanded or constricted, thereby loosening or tightening the hem around the waist opening.

The front sheet comprises a right breast and a left breast, which are adjustably connected together by a first closure means, such as a zipper, cooperating Velcro strips, or a series of buttons or snaps. The first closure means can be adjusted to fully or partially separate the right breast and the left breast, so that the front of the garment is fully or partially open. The closure means can extend through the bottom border of the front sheet, thereby giving the garment a jacket configuration, or alternately the closure means can terminate at a position above the bottom border of the front sheet, thereby giving the garment a pull-over configuration. Optionally, the right and/or left breast can contain one or more pockets.

The garment further comprises a full frontal liner, which is a roughly rectangular piece of light fabric or mesh that is attached is to the interior surfaces of the two shoulder seams and the two side seams. The full frontal liner is also attached to two arm seams, which are a right arm seam and a left arm seam. The full frontal liner is also attached to the interior surface of the front sheet just above the hem. The area between the full frontal liner and the interior surface of the front sheet forms a sack-like pet enclosure.

In the jacket configuration of the garment, the full frontal liner is divided into a right liner and a left liner, which are adjustably interconnected by a second closure means, such as a zipper, cooperating Velcro strips, or a series of buttons or snaps. In the jacket configuration, both the first closure means and the second closure means are completely opened when the pet owner is donning the garment or removing it. After donning the garment, the owner initially closes the second closure means, and then partially closes the first closure means, thus creating the pet enclosure. The drawstring is then tightened to support the pet enclosure from below. After the pet is placed inside the pet enclosure, the first closure means can be further closed to confine the pet to the extent desired.

In the pull-over configuration, the first closure means is opened to facilitate donning or removing the garment. The pet owner dons the garment by inserting his or her head through the waist opening and then through the neck opening, and then pulling the garment down over his or her upper torso. After donning the garment, the owner initially partially closes the first closure means, thus creating the pet enclosure. The drawstring is then tightened to support the pet enclosure from below. After the pet is placed inside the pet enclosure, the first closure means can be further closed to confine the pet to the extent desired. The pet is then able to either curl up inside the pet enclosure or sit upright with its head protruding from between the right and left breasts of the front sheet.

A more complete understanding of the present invention will be gained by referring to the drawings and the detailed description which follows herein. While the detailed description relates to a particular embodiment of the present invention, this is not intended to limit the scope of the invention, as defined by the claims, which extend to all embodiments which might be derived from this disclosure by one skilled in the art.

DETAILED DESCRIPTION OF THE PREFERRED EMBODIMENT

Figure 1:
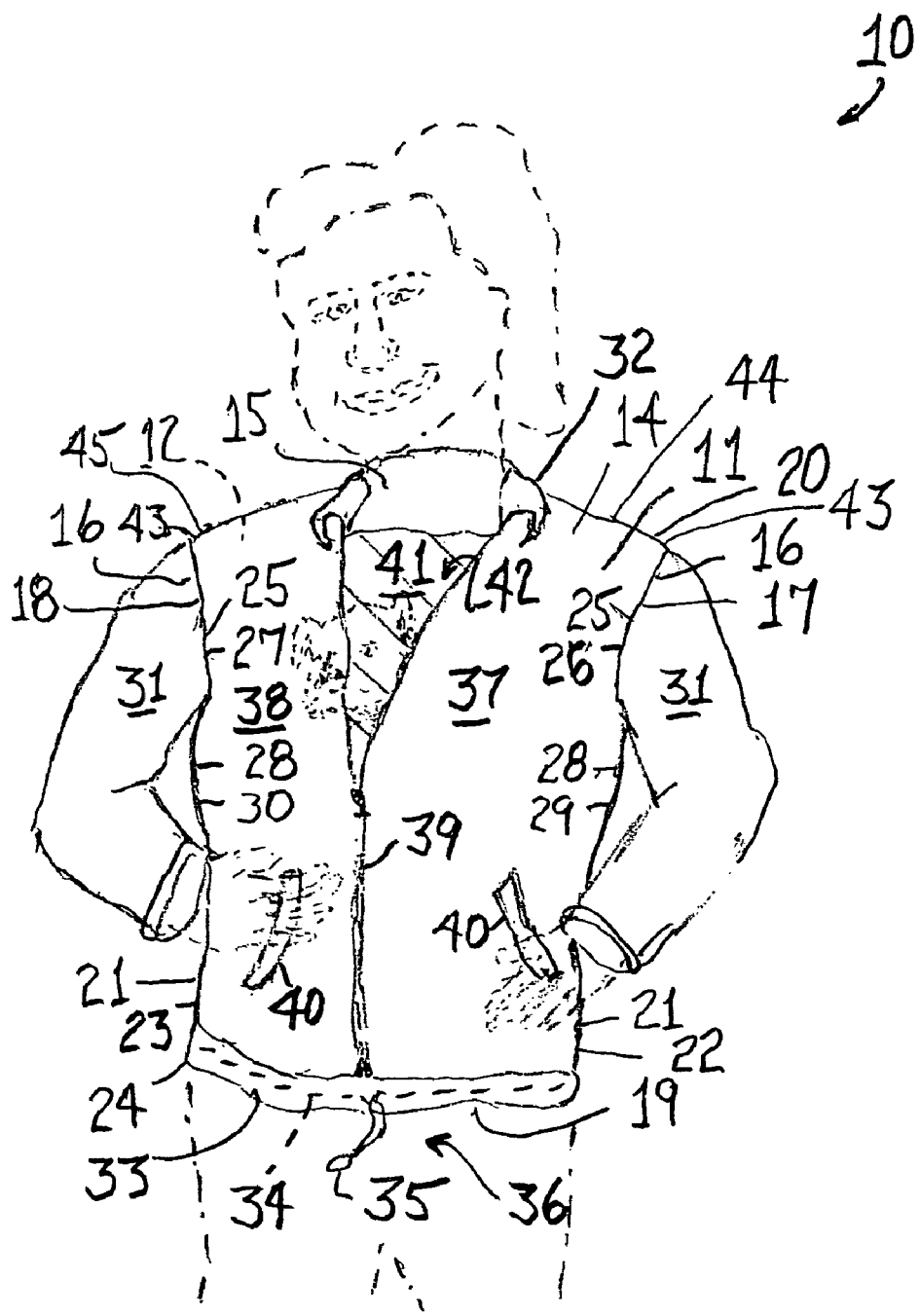
FIG. 1 is a frontal external view of a pet carrier garment according to the waist-length preferred embodiment of the present invention, with a pet owner and pet in ghost view.
Figure 2:
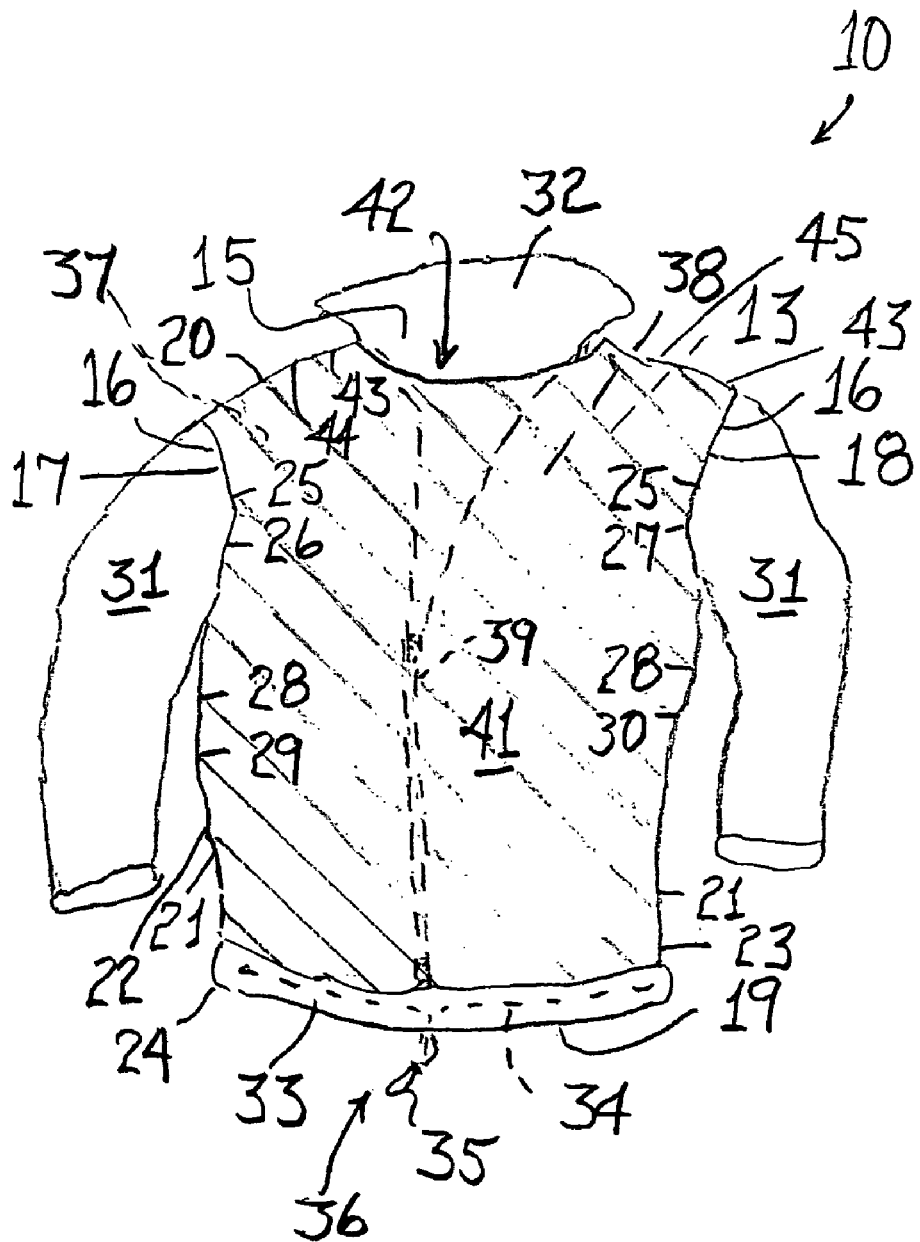
FIG. 2 is a frontal interior (inside-out) view of a pet carrier garment according to the waist-length preferred embodiment of the present invention.

Referring to FIG. 1 and FIG. 2, the garment 10 comprises two sheets, a front sheet 11 and a back sheet 12, both consisting of roughly rectangular pieces of cloth having dimensions corresponding to those of an upper human torso. The front sheet 11 and the back sheet 12 can be single-layered or multi-layered, lined or unlined, and they can be composites of multiple pieces of interconnected cloth. The front sheet 11 and the back 12 sheet each have an interior surface 13 and an exterior surface 14. The garment further comprises a neck opening 15, two arm openings 16 (a right arm opening 18 and a left arm opening 17), and a waist opening 19. The front sheet 11 and the back sheet 12 each have four borders: a top border 20, two side borders 21 (a right-side border 23 and a left-side border 22), and a bottom border 24. The top border 20 of the front sheet 11 is attached to the top border 20 of the back sheet 11 at two shoulder seams 43 (a right shoulder seam 45 and a left shoulder seam 44), which extend from the tops of the arm openings 16 to either side of the neck opening 15. The two side borders 21 of the front sheet 11 are attached to the two side borders 21 of the back sheet at two side seams 28 (a right side seam 30 and a left side seam 29). The right-side border 23 of the front sheet 11 is attached to the left-side border 22 of the back sheet 12 at the right side seam 30, which extends from the bottom of the right arm opening 18 to the place where the bottom borders 24 of the two sheets 11 12 meet. The left-side border 22 of the front sheet 11 is attached to the right-side border 23 of the back sheet 12 at the left side seam 29, which extends from the bottom of the left arm opening 17 to the place where the bottom borders 24 of the two sheets 11 12 meet.

The space between the unattached sections of the bottom borders 24 of the front 11 and back 12 sheets, or the space between sections of the front 11 and back 12 sheets above the bottom border, can be expanded to make an opening approximately 25 to 45 inches in circumference, which constitutes the waist opening 19. The area between the unattached sections of the top borders 20 of the front 11 and back 12 sheets can be expanded to make an opening approximately 12 to 18 inches in circumference, which constitutes the neck opening 15. The two areas between the unattached sections of the side borders 21 of the front 11 and back 12 sheets can be expanded to make two openings, each approximately 12 to 18 inches in circumference, which constitute the arm openings 16.

Optionally, a short, half, or full sleeve 31 can extend from each of the arm openings 16. Optionally, a collar 32 or hood (not shown) can extend from around the neck opening 15.

Figure 3:
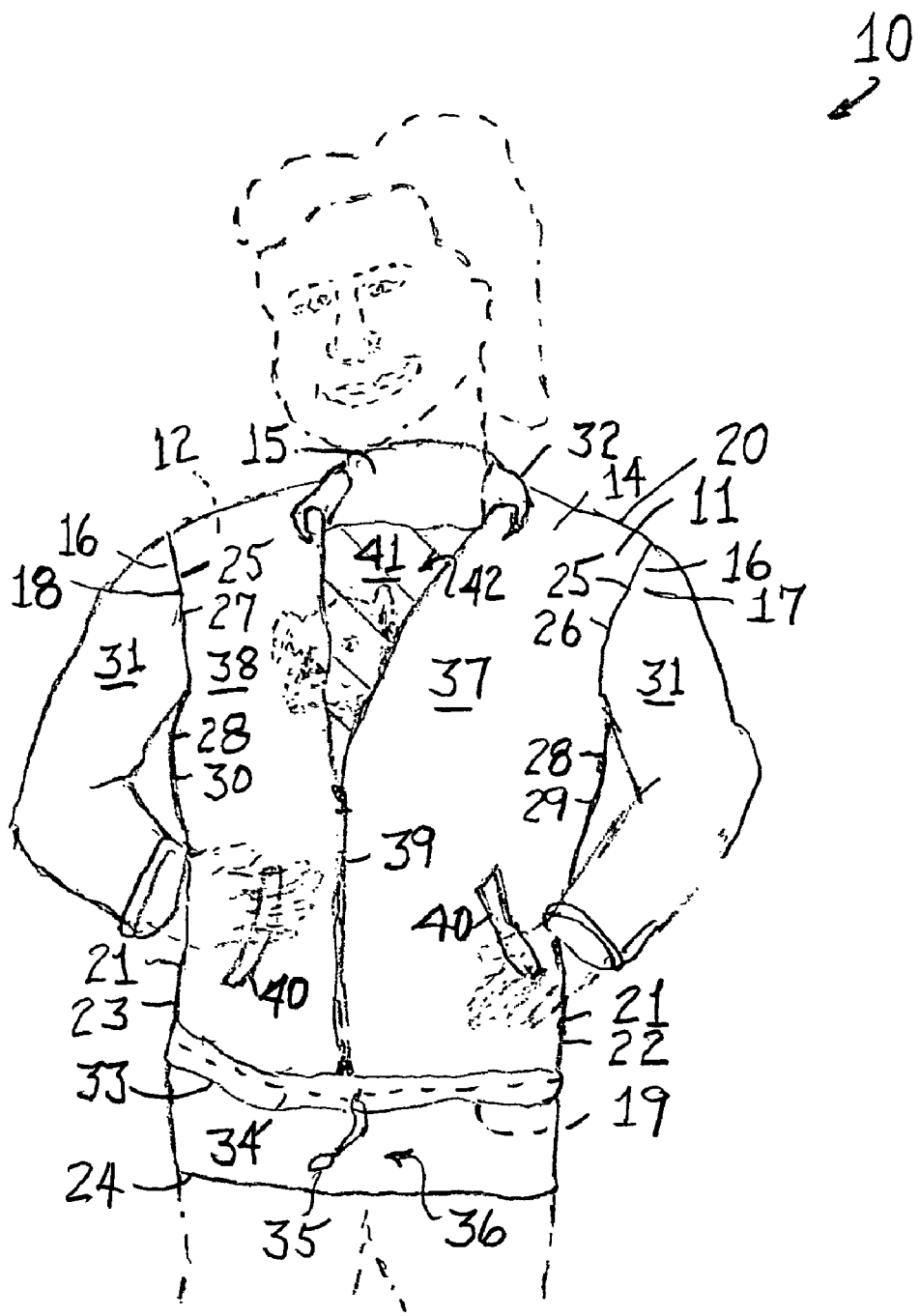
FIG. 3 is a frontal external view of a pet carrier garment according to the hip-length preferred embodiment of the present invention, with a pet owner and pet in ghost view.
Figure 4:
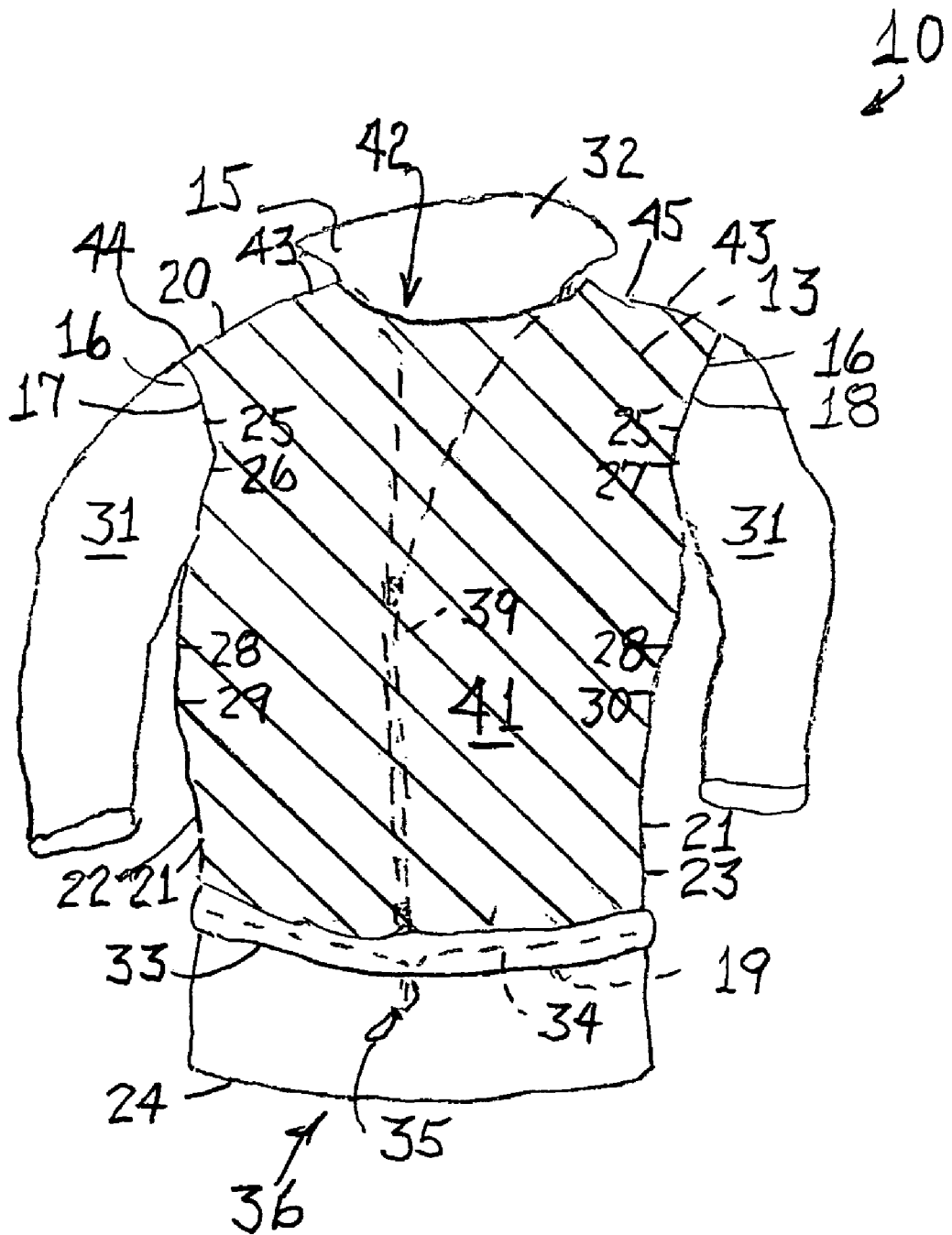
FIG. 4 is a frontal interior (inside-out) view of a pet carrier garment according to the hip-length preferred embodiment of the present invention.

For a waist-length garment, such as the one depicted in FIGS. 1 and 2, the bottom borders 24 of the front 11 and back 12 sheets are doubled over to create a hem 33 around the waist opening 19. Alternately, for a garment that extends below the wearer's waist, as depicted in FIGS. 3 and 4, sections of the front 11 and back 12 sheets above the bottom borders 24 are doubled over to create a hem 33 around the waist opening 19. The hem 33 can also be formed as a narrow channel within two cooperating multi-layered segments of the front 11 and back 12 sheets. Within the hem 33 is inserted a cord 34 of length about 3 to 6 inches greater than the circumference of the waist opening 19. The opposite ends 35 of the cord 34 are juxtaposed to form a drawstring 36, whereby the length of the portion of the cord 34 within the hem 33 can be expanded or constricted, thereby loosening or tightening the hem 33 around the waist opening 19.

The front sheet 11 comprises a right breast 37 and a left breast 38, which are adjustably connected together by a first closure means 39, such as a zipper, cooperating Velcro strips, or a series of buttons or snaps. In the preferred embodiment of the garment 10, the first closure means 39 terminates at a position above the hem 33, thereby giving the garment 10 a pull-over configuration. The first closure means 39 can be adjusted to partially separate the right breast 37 and the left breast 38, so that the front of the garment 10 is partially open. Optionally, the right 37 and/or left 38 breast can contain one or more pockets 40.

Referring to FIGS. 2 and 4, the garment 10 further comprises a full frontal liner 41, which is a roughly rectangular piece of light fabric or mesh that is attached is to the interior surfaces 13 of the two shoulder seams 25 and the two side seams 28. The full frontal liner 41 is also attached to two arm seams 43, which are a right arm seam 45 and a left arm seam 44. The full frontal liner 41 is also attached to the interior surface 13 of the front sheet 11 just above the hem 33. The area between the full frontal liner 41 and the interior surface 13 of the front sheet 11 forms a sack-like pet enclosure 42.

A pet is carried in the garment 10 by opening the front sheet 11 of the garment 10 using the first closure means 39 and placing the pet inside the pet enclosure 42. The front sheet 11 of the garment 10 is then fully or partially closed using the closure means 39, and the hem 33 is tightened around the waist or hips of the pet owner using the drawstring 36. The pet is then able to either curl up inside the pet enclosure or sit upright with its head protruding from between the right 37 and left 38 breasts of the front sheet 11.

While this invention has been described with reference to a specific embodiment, the description is not to be construed in a limiting sense. Various modifications of the disclosed embodiment, as well other embodiments of the invention, will be apparent to persons skilled in the art upon reference to this description. It is therefore contemplated that the appended claims will cover any such modifications or embodiments that fall within the true scope of this invention.

What is claimed is:

1. A pet carrier garment, comprising:
   (a) an outer garment, comprising a front sheet, a back sheet, a neck opening, two arm openings (a right arm opening and a left arm opening), and a waist opening, wherein the front sheet and the back sheets are two roughly rectangular pieces or composite pieces of single-layered or multi-layered cloth, each having four borders, namely a top border, a right-side border, a left-side border, and a bottom border, and wherein the top borders of the front sheet and the back sheet are attached by two shoulder seams extending from the tops of the arm openings to either side of the neck opening, and wherein the right-side border of the front sheet is attached to the left-side border of the back sheet by a right side seam extending from the bottom of the right arm opening to the place where the bottom borders of the front sheet and the back sheet meet, and wherein the left-side border of the front sheet is attached to the right-side border of the back sheet by a left side seam extending from the bottom of the left arm opening to the place where the bottom borders of the front sheet and the back sheet meet, and wherein the bottom borders of the front sheet and the back sheet, or sections of the front sheet and the back sheet above the bottom borders, are doubled over or channeled to create a hem, which hem surrounds the waist opening, and within which hem is inserted a cord of length greater than the circumference of the waist opening, the opposite ends of which cord are juxtaposed to form a drawstring, whereby the length of the portion of the cord within the hem can be expanded or constricted, thereby loosening or tightening the waist opening, and wherein the front sheet comprises a right breast and a left breast, which are adjustably connected together by a first closure means, which first closure means extends from the neck opening to a position above the hem, and which first closure means can be adjusted to partially separate the right breast and the left breast, so that the front sheet is partially opened; and
   (b) a one-piece full frontal liner, which is a roughly rectangular piece of light fabric or mesh that is attached to the interior surfaces of the two shoulder seams and the two side seams (the right side seam and the left side seam), which full frontal liner is also attached to two arm seams (a right arm seam and a left arm seam) around the fronts of the two arm openings, and which full frontal liner is also attached to the interior surface of the front sheet just above the hem, and which full frontal liner is unattached around the neck opening, such that the entire area between the full frontal liner and the interior surface of the front sheet forms a sack-like pet enclosure.

2. The pet carrier garment according to claim 1, wherein a short, half, or full sleeve extends from each of the arm openings.

3. The pet carrier garment according to either of claim 1 or 2, wherein a collar or hood extends from around the neck opening.

4. The pet carrier garment according to claim 3, wherein the right and/or left breast contains one or more pockets.

5. The pet carrier garment according to either of claim 1 or 2, wherein the right and/or left breast contains one or more pockets.

6. A pet carrier garment, comprising:
   (a) an outer garment, comprising a front sheet, a back sheet, a neck opening, two arm openings (a right arm opening and a left arm opening), and a waist opening, wherein the front sheet and the back sheets are two roughly rectangular pieces or composite pieces of single-layered or multi-layered cloth, each having four borders, namely a top border, a right-side border, a left-side border, and a bottom border, and wherein the top borders of the front sheet and the back sheet are attached by two shoulder seams extending from the tops of the arm openings to either side of the neck opening, and wherein the right-side border of the front sheet is attached to the left-side border of the back sheet by a right side seam extending from the bottom of the right arm opening to the place where the bottom borders of the front sheet and the back sheet meet, and wherein the left-side border of the front sheet is attached to the right-side border of the back sheet by a left side seam extending from the bottom of the left arm opening to the place where the bottom borders of the front sheet and the back sheet meet, and wherein the bottom borders of the front sheet and the back sheet, or sections of the front sheet and the back sheet above the bottom borders, are doubled over or channeled to create a hem, which hem surrounds the waist opening, and within which hem is inserted a cord of length greater than the circumference of the waist opening, the opposite ends of which cord are juxtaposed to form a drawstring, whereby the length of the portion of the cord within the hem can be expanded or constricted, thereby loosening or tightening the waist opening, and wherein the front sheet comprises a right breast and a left breast, which are adjustably connected together by a first closure means, which first closure means extends from the neck opening to the bottom border of the front sheet, and which first closure means can be adjusted to fully or partially separate the right breast and the left breast, so that the front sheet is fully or partially opened; and (b) a one-piece full frontal liner, which is a roughly rectangular piece of light fabric or mesh that is attached to the interior surfaces of the two shoulder seams and the two side seams (the right side seam and the left side seam), which full frontal liner is also attached to two arm seams (a right arm seam and a left arm seam) around the fronts of the two arm openings, and which full frontal liner is also attached to the interior surface of the front sheet just above the hem, and which full frontal liner is unattached around the neck opening, such that the entire area between the full frontal liner and the interior surface of the front sheet forms a sack-like pet enclosure, and which full frontal liner is divided into a right liner and a left liner, which are adjustably interconnected by a second closure means.

7. The pet carrier garment according to claim 6, wherein a short, half, or full sleeve extends from each of the arm openings.

8. The pet carrier garment according to either of claim 6 or 7, wherein a collar or hood extends from around the neck opening.

9. The pet carrier garment according to claim 8, wherein the right and/or left breast contains one or more pockets.

10. The pet carrier garment according to either of claim 6 or 7, wherein the right and/or left breast contains one or more pockets.

* * * * *